April 18, 1961 J. E. KELLEHER 2,980,756
ELECTRICAL OUTLET LEVELER
Filed Sept. 29, 1958

INVENTOR.
JOHN E. KELLEHER
BY
Lyon + Lyon
ATTORNEYS

United States Patent Office 2,980,756
Patented Apr. 18, 1961

2,980,756
ELECTRICAL OUTLET LEVELER
John E. Kelleher, Rte. 4, Box 32, Vista, Calif.
Filed Sept. 29, 1958, Ser. No. 764,167
3 Claims. (Cl. 174—57)

This invention relates to electrical outlet levelers, and included in the objects of this invention are:

First, to provide a leveler which, when used singly or in multiple, enables an electrical outlet or switch to be adjusted or leveled flush with a wall surface, irrespective of the depth the outlet or switch box may be recessed into a wall.

Second, to provide a leveler which compensates for inclination of the outlet or switch box, or the mounting lug, relative to the wall surface.

Third, to provide a leveler which as a single unit may compensate for as much as a half inch variation in the position of the outlet or switch box.

Fourth, to provide a leveler which yields to the force exerted by an outlet or switch mounting screw, yet provides a firm foundation for support of the outlet or switch.

Fifth, to provide a leveler which may be placed one on the other in crosswise relation and, when compressed by the mounting screw, provides stable four-point engagement therebetween.

With the above and other objects in view, as may appear hereinafter, reference is directed to the accompanying drawings in which.

Figure 1:
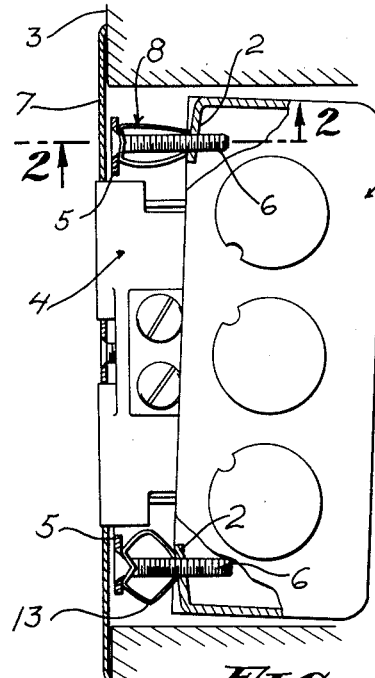
Figure 1 is a partial sectional, partial side view of an outlet box and an outlet fixture with the adjacent wall indicated diagramatically and in section, and showing a pair of electrical outlet levelers in use.

The electrical outlet leveler is adapted to be used in conjunction with a conventional outlet box 1. The conventional outlet box 1 is a rectangular metal box having inturned mounting lugs 2. The outlet box 1 is set into a wall or floor and is intended to be mounted with the lugs 2 substantially flush with a surrounding wall 3.

In practice, however, the lugs 2 are seldom flush with the wall 3. That is, the box 1 is recessed from the surface so that the location of the lugs 2 may be anywhere from a small fraction of an inch to a distance substantially greater than one inch. This may be due to carelessness in locating the box before finishing the wall, or to changes in the wall surface, such as the adding of tile or paneling, not originally contemplated. Furthermore, the outlet box 1 is intended to be mounted with its outer or open side parallel with the wall surface. Many times this desired condition is not obtained, and, as a consequence, the problem of properly locating an outlet fixture, designated 4, with respect to the wall surface is often difficult.

The conventional outlet fixture 4 includes a mounting strap 5 which is provided near its ends with perforations located so as to align approximately with screw-threaded holes provided in the mounting lugs 2. The outlet fixture 4 is attached to the outlet box 1 by means of screws 6 extending through the perforations in the mounting strap 5 and into the screw-threaded holes of the mounting lugs 2. If the outlet box 1 is properly positioned, the mounting strap 5 is tightly secured to the mounting lug 2. An escutcheon plate 7 is then secured to the outlet fixture 4 so as to overlie the outer surface of the surrounding wall.

If the outlet box 1 is not ideally located, a leveler, designated generally by 8, which constitutes the subject of the present invention, is utilized. The leveler 8 is formed of a strip of metal which is bent to provide a pair of legs or strut elements 9. The legs or strut elements 9 are joined at one end to a cross portion or bridge element 10, that is, the leveler is essentially U-shaped. The cross portion is provided with a hole 11.

The electrical outlet leveler is employed as follows:

A screw 6 of appropriate length is selected, and the leveler 8 is interposed between each end of the mounting strap 5 and the mounting lug 2 with the screw 6 extending through the hole 11. In actual practice, the legs 9 of the leveler 8 are approximately one-half inch in length. In most installations, the outlet or switch box 1, though recessed, is less than one-half inch from the surface of the wall. Consequently, the leveler is initially longer than the depth of the recess. If this is the case, the screw 6 is tightened to place the leg or strut elements 9 under compression.

The metal from which the leveler 8 is constructed is bendable and essentially nonresilient, and, while having sufficient stiffness to support the outlet fixture 4, is capable of being bent by the compressive force, which may be exerted when the screw 6 is tightened, until the corresponding end of the mounting strap 5 is in proper relation with the surface of the wall.

If, as shown in Figure 1, the outlet box 1 is disposed at an angle to the wall surface, one leveler 8 may be compressed more than the other. In fact, the leveler may be compressed until the legs 9 have folded double, as indicated by 12 in Figure 2. Normally, however, the legs merely bow outwardly, as indicated by 13 in several of the figures.

Outward bowing of the legs 9 causes an inward bowing of the cross portion or bridge element 10, as indicated by 14. This causes the junctures between the bridge element or cross portion 10 and the strut elements 9 to form parallel ribs 15. The levelers 8 are positioned so that the extremities of the legs or strut elements 9 engage the mounting lugs 2 of the outlet box 1, whereas the cross portion 10 engages the mounting strap 5. As a consequence, the ribs 15 bear against the strap 5 and impart lateral stability thereto.

It should be observed that the mounting lugs 2 in a conventional outlet box are not parallel with its outer or open side, but are inclined so that the face of each lug engaged by the bridge element 10 is in parallel with the mounting strap 5. It is therefore desirable to position the levelers 8 so that they are transversely disposed to the slope of the mounting lugs 2. This permits one bridge element to bend more than the other to compensate for this slope, and permits the ribs 15 to engage the mounting strap 5.

Figure 3:
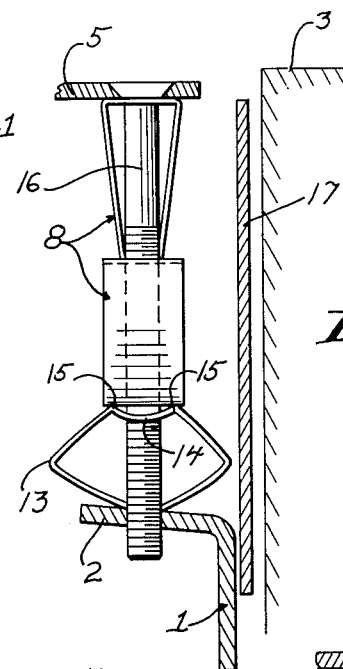
Figure 3 is an enlarged side view showing several levelers stacked in series between an outlet box and a mounting strap of an outlet fixture, the outlet box and mounting strap being shown in section and fragmentarily, and the adjacent wall being shown diagrammatically and in section.
Figure 4:
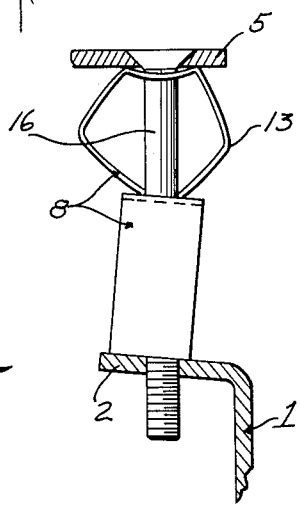
Figure 4 is a sectional view of a pair of levelers between the mounting lug of a box and the mounting strap of an outlet fixture, the outlet box and mounting strap being shown fragmentarily.
Figure 6:
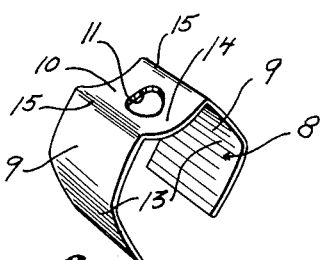
Figure 6 is a similar perspective view showing the leveler partially compressed.

As indicated previously, the outlet box 1 is usually recessed less than one-half inch into the wall so that only one leveler 8 is needed at each end of the mounting strap 5. If, however, the outlet box is recessed to a greater depth, two or three, or more, levelers may be employed in tandem, as shown in Figures 3 and 4, by utilizing elongated screws 16. In this case, the levelers 8 are preferably placed at right angles to each other so that the ribs 15 of one leveler are disposed at right angles to the strut elements 9 of the adjacent leveler.

If the outlet box is so deeply recessed as to require several levelers, electrical code requirements may necessitate the placement of a sheet metal band 17 around the walls of the opening in which the outlet box is recessed, as shown in Figure 3.

Figure 2:
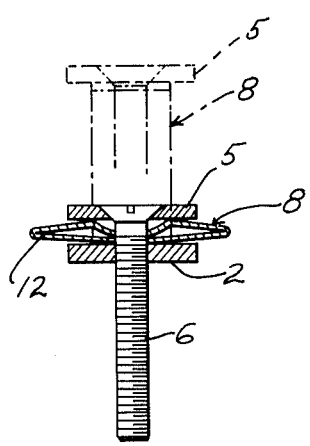
Figure 2 is an enlarged, fragmentary, sectional view taken through 2—2 of Figure 1 showing a leveler by broken lines in its maximum position and by solid lines in substantially its minimum position.
Figure 5:
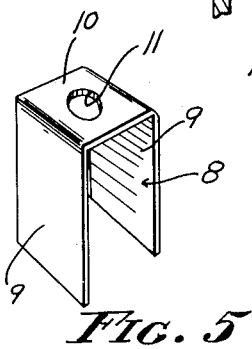
Figure 5 is an enlarged perspective view of one of the levelers in its normal or extended position.

By reason of the fact that the levelers 8 may be compressed until substantially flat, as shown in Figure 2, one size of leveler is capable of meeting all installation problems, whether the outlet box be recessed only slightly or excessively.

It should be observed that while the terms "outlet box" and "outlet fixture" have been used, the levelers 8 may be utilized with other types of electrical boxes or fixtures, as, for example, switch boxes and switches, whether of the single or multiple type, providing, of course, that the box be provided with mounting lugs and that the fixture be provided with a strap through which screws extend to the mounting lugs.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. The combination with an outlet box having a pair of inturned mounting lugs with screw-threaded apertures, an outlet fixture having a mounting strap, and a screw member for joining each end of said mounting strap to said box, of a leveler means for installation on said screw member between a mounting lug and said mounting strap, comprising: a pair of strut elements disposed on opposite sides of each of said screw members with their ends in bearing engagement with a corresponding lug and end of said strap member; said strut elements adapted on tightening of said screw member to draw said lug and strap member end toward each other to bow outwardly from each other between an initially, substantially straight condition extending substantially axially with respect to the screw member and a fully folded condition wherein each strut is folded upon itself; said strut elements being formed of a substantially nonresilient, relatively stiff material tending, for any of its folded conditions between said initial and fully folded conditions, to restrain said lug and strap member end against relative displacement, and a perforated cross element connecting said strut elements and adapted to receive said screw.

2. The combination with an outlet box having a pair of inturned mounting lugs with screw-threaded apertures, an outlet fixture having a mounting strap, and a screw member for joining each end of said mounting strap to said box, of a leveler means for installation on said screw member between a mounting lug and said mounting strap, comprising: a pair of strut elements disposed on opposite sides of each of said screw members with their ends in bearing engagement with a corresponding lug and end of said strap member; said strut elements adapted on tightening of said screw member to draw said lug and strap member end toward each other to bow outwardly from each other between an initially, substantially straight condition extending substantially axially with respect to the screw member and a fully folded condition wherein each strut is folded upon itself; said strut elements being formed of a substantially nonresilient, relatively stiff material tending, for any of its folded conditions between said initial and fully folded conditions, to restrain said lug and strap member end against relative displacement; a perforated cross element integrally connecting said strut elements and slidable on a corresponding screw member; said strut elements adapted to converge axially from said cross element into engagement with opposite sides of said screw member at the extended ends of said strut elements.

3. A leveler as set forth in claim 2, wherein: said strut elements are stacked in series relation on a corresponding screw member.

References Cited in the file of this patent

UNITED STATES PATENTS

| | | |
|---|---|---|
| 1,142,695 | Goodridge | June 8, 1915 |
| 1,505,301 | Thompson | Aug. 19, 1924 |
| 1,537,823 | Henderson | May 12, 1925 |
| 1,688,518 | Bennett | Oct. 23, 1928 |
| 1,694,054 | Both | Dec. 4, 1928 |
| 1,817,573 | Martin | Aug. 4, 1931 |
| 2,183,872 | Rowe | Dec. 19, 1939 |